May 24, 1966  E. P. HAEN  3,252,444
DUMPING CARRIER LIVESTOCK FEEDER
Filed April 7, 1964  3 Sheets-Sheet 1
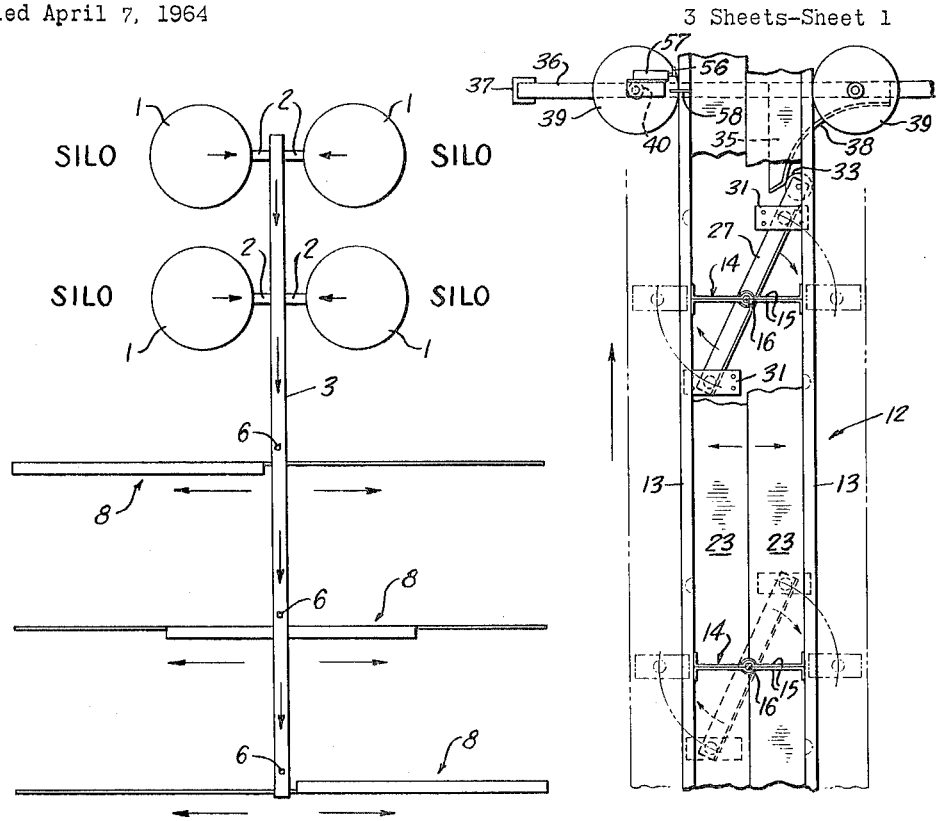
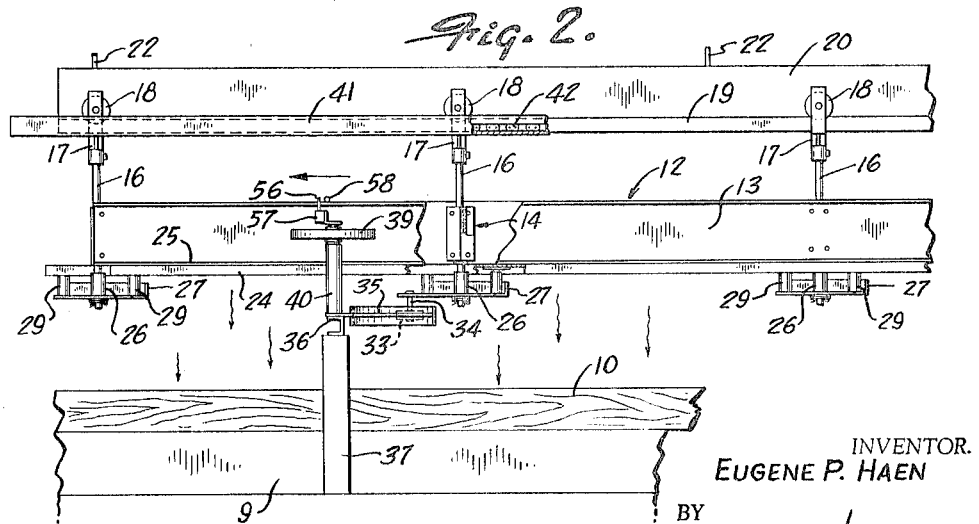
INVENTOR.
EUGENE P. HAEN
BY Andrus & Starke
ATTORNEYS

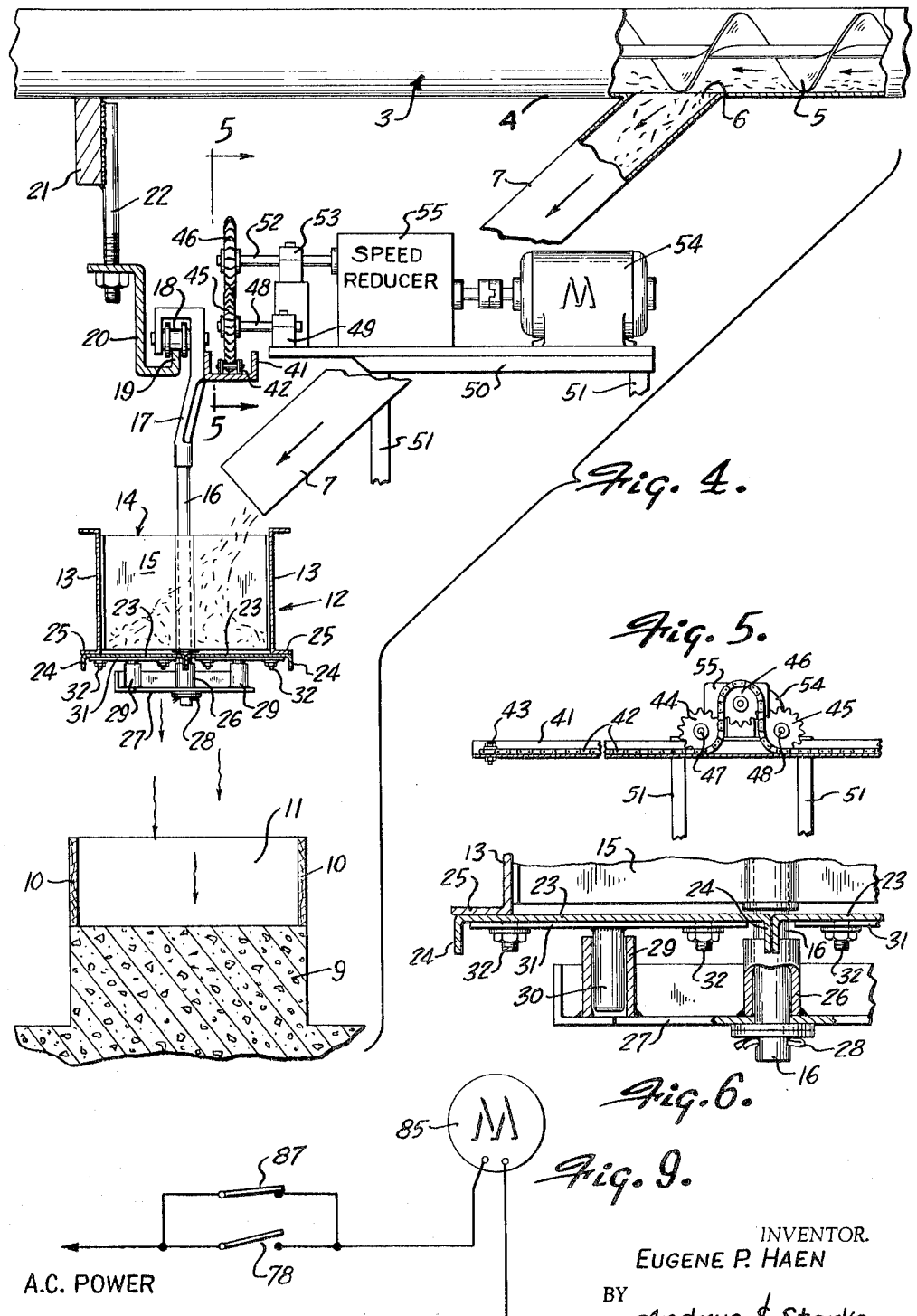

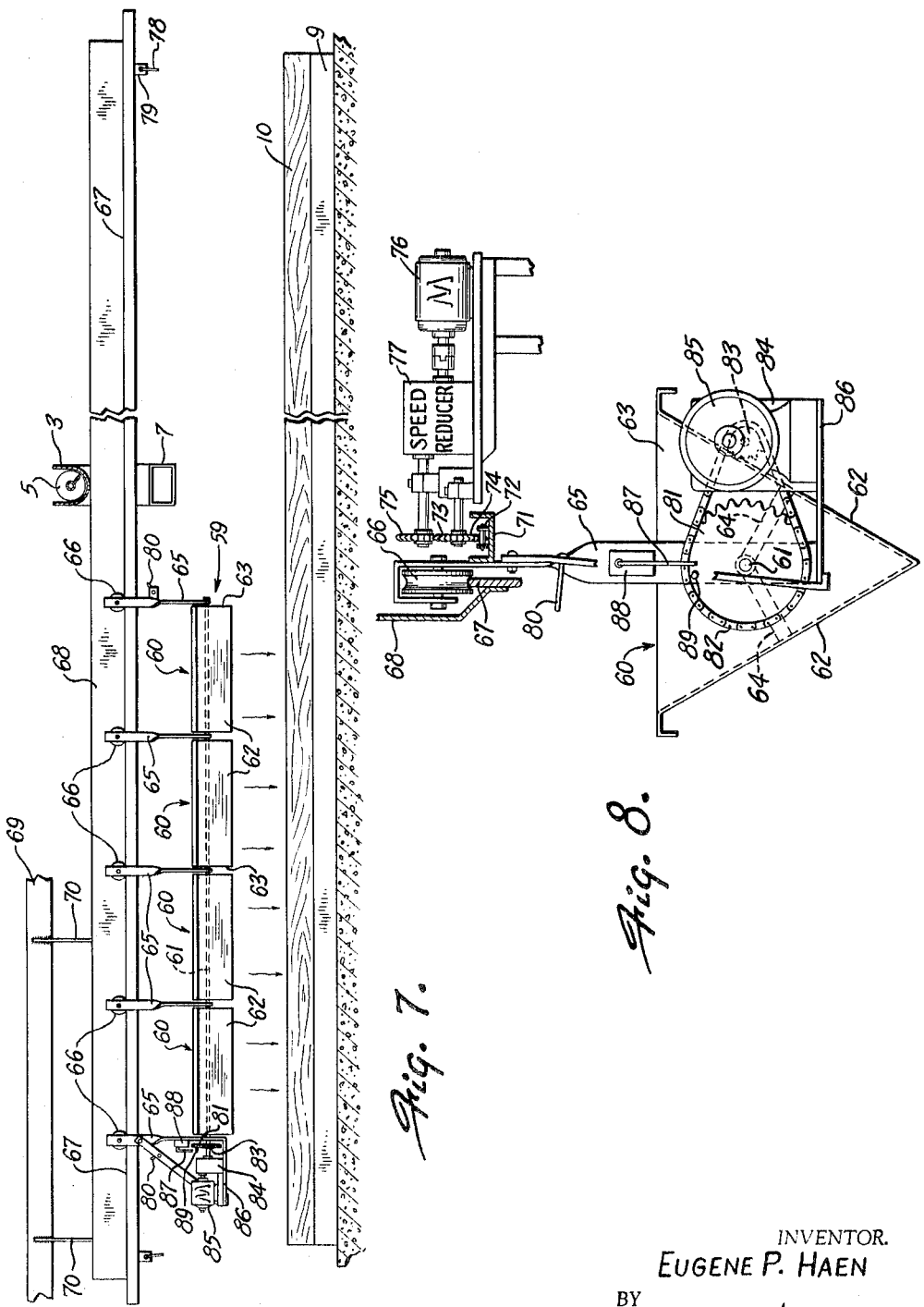

3,252,444
DUMPING CARRIER LIVESTOCK FEEDER
Eugene P. Haen, Kaukauna, Wis., assignor to Badger Northland, Inc., a corporation of Delaware
Filed Apr. 7, 1964, Ser. No. 357,966
7 Claims. (Cl. 119—52)

This invention relates to a livestock feeding apparatus and more particularly to a livestock feeder utilizing a moveable feed carrier.

In recent years, there has been increased activity in mechanized feeding units in which the feed is conveyed automatically from a silo or other storage structure to a livestock feeding area.

The most common feeding unit utilizes an auger or spiral flight to convey the feed within a conveyor housing. In some cases, the conveyor housing is provided with a series of openings spaced along the bottom of the housing and the feed is progressively discharged through the openings to a feed area, while in other types of feeders the conveyor housing is provided with a continuous opening along the bottom and the feed conveyed by the auger is discharged through the opening into a trough or feed distributing member. When the entire length of the trough is filled with feed, it is dumped so that the feed is distributed simultaneously along the entire length of the feeding area.

More recently, a livestock feeder has been developed which eliminates the use of the conventional auger and utilizes a moveable feed carrier. Feeders of this type include an elongated carrier or trough having an open top to receive feed and having an opening in the bottom closed off by doors or closures. The carrier is mounted for reciprocating movement on the guide track and a feed supply member is positioned generally at the midpoint of the track above the path of travel of the carrier. Feed is continuously discharged from the feed supply member into the carrier as it moves in its reciprocating path of travel. When the carrier reaches an end point of travel, the doors are automatically opened to dump feed to the feed area and the carrier simultaneously begins its reverse movement in the opposite direction. This reciprocating movement is repeated with the carrier moving back and forth beneath the feed supply member and dumping feed to the feed area when the carrier reaches the end points of its path of travel.

The present invention is an improvement to this type of feeder employing a reciprocating feed carrier. According to the invention, the bottom of the carrier is enclosed by a pair of doors which extend the entire length of the carrier. The doors are mounted for pivotal movement in a horizontal plane and an actuating member or lever is connected to the doors and is adapted to engage an obstruction when the carrier reaches a given point in its path of travel. Engagement of the actuating member or lever with the obstruction, pivots the doors to the open position to thereby dump the feed to the feed area.

The livestock feeder of the invention also employs a novel drive mechanism for reciprocating the carrier in its path of travel. The drive mechanism includes a chain which is secured within a trough connected to the hangers for the feed carrier. The chain is trained over a drive sprocket and rotation of the drive sprocket serves to move the chain and feed carrier along the feed bunk.

In a modified form of the invention, the carrier is provided with a generally V-shape in cross section. Instead of the carrier having doors which open to dump the feed, the carrier in this embodiment is rotated to an inverted position to dump the feed to the feed area.

The moveable feed carrier of the invention eliminates separation of various types of feed which occurs when using an auger type of conveying mechanism. In an auger type feeder, the fine material will be discharged through the openings in the auger housing at a location close to the feed supply, while the coarse or rough material will be carried on to the end of the conveyor. In contrast to this, the reciprocating trough or carrier of the invention eliminates separation of the fine and coarse materials and both are uniformly distributed to the feed area or bunk.

The feed carrier of the invention is of simple construction and the doors are automatically opened when the carrier reaches an end point in its path of travel to simultaneously dump the feed to one half of the feed area.

The amount of feed distributed to the feed area can be regulated by the number of dumps which are made, and also by varying the speed of the carrier. As the speed of the carrier is reduced, a proportionately larger amount of feed will be introduced into the carrier, and conversely as the speed of the carrier is increased, the amount of feed will be reduced.

Other objects and advantages will appear in the course of the following description.

The drawings illustrate the best mode presently contemplated of carrying out the invention.

In the drawings:

FIG. 1 is a schematic representation of a barnyard installation employing a series of livestock feeders of the invention;

FIG. 2 is a fragmentary side elevation of the livestock feeder with parts broken away in section;

FIG. 3 is a fragmentary plan view of the feeder with parts broken away in section with the phantom lines indicating the position of the doors in the open position;

FIG. 4 is a transverse section through the feeder and showing the drive mechanism for reciprocating the carrier;

FIG. 5 is a section taken along line 5—5 of FIG. 4;

FIG. 6 is an enlarged fragmentary transverse section showing the door operating mechanism;

FIG. 7 is a side elevation of a modified form of the invention using a V-shaped feed carrier;

FIG. 8 is an end view of the feeder shown in FIG. 7, and

FIG. 9 is a schematic wiring diagram for the feeder.

FIG. 1 shows a barnyard installation including four silos 1 which are adapted to contain a livestock feed, such as corn silage or grass silage. The feed is conveyed from each of the silos 1 by a conveyor 2 which discharges the feed into a main conveyor 3. The conveyor 3 may be any type of conventional conveyor, used to convey feed material. As shown in the drawings, the conveyor 3 includes a conveyor housing 4 and an auger 5 which rotates and conveys the feed through the housing. The housing 4 is provided with a series of openings 6 and a chute 7 communicates with each opening and extends downwardly to a location above a feeding unit 8 so that feed is continuously discharged through the openings 6 and chute 7 to the feeding units 8.

Each of the feeding units 8 includes an elevated concrete feed bunk 9 having a pair of side walls 10 and a pair of end walls 11 extending upwardly from the feed bunk.

An elongated feed carrier 12 is supported for reciprocating movement above the feed bunk and the carrier has a length approximately equal to one-half the length of the feed bunk 9.

The carrier 12 includes a pair of side walls 13 and a series of transverse walls 14 which connect the side walls together.

Each of the transverse walls 14 includes a pair of channel members 15 which are disposed in a back-to-back relation with the flanges of the channel members being secured to the respective side walls 13. The channel members 15 are provided with matching central recesses and a rod 16 is disposed within the recesses in the channel members. The upper end of each rod 16 is secured to a bracket 17 which carries a roller 18, and the rollers 18 are mounted to ride on the upstanding rail 19 of track 20. The track 20 extends the length of the feed bunk 9. The track 20 is supported from a beam 21 by a series of studs 22 which are welded to the beam. The beam 21 can be supported in any desired manner.

The lower end of the feed carrier 12 is enclosed by a pair of doors 23 which extend the length of the feed carrier. As best shown in FIG. 2, at each end of the carrier, an end of one of the doors 23 projects outwardly beyond the corresponding end of the other door. The side edges of doors 23 are provided with downwardly extending flanges 24, and the inner side edges of the doors 23 are provided with matching recesses which receive the rods 16. In opening and closing, the doors are adapted to ride against the lower flanges 25 of side walls 13.

The lower end of each rod 16 is journalled within a bushing 26 which is mounted on the horizontal flange of an angle bar 27 located beneath doors 23 and is retained within the bushing by a cotter pin 28.

A pair of bushings 29 are mounted on angle bar 27, on either side of bushing 26, and each bushing 29 journals a downwardly extending pin 30. Each pin 30 is welded to a plate 31 secured to the underside of door 23 by bolts 32.

When the doors 23 are in the closed position, the angle bars 27 are located at an acute angle with respect to the longitudinal centerline of the carrier. By pivoting the angle bars 27 to a position generally normal to the longitudinal centerline of carrier 12, the doors will be moved horizontally to an open position, as shown by the phantom lines in FIG. 3.

To pivot the angle bars 27 and open the doors 23 when the carrier 12 reaches an end point in its path of travel, a cam follower 33 is journalled within a bracket 34 which extends downwardly from one end of one of the angle bars 27. The cam follower 33 is adapted to engage a cam 35 which is mounted on a horizontal channel 36 carried by upstanding supports 37. The cam 35 is located at a level beneath the path of travel of the carrier 12 and is provided with a curved cam surface 38. The cam 35 is positioned with respect to the feed bunk so that the carrier 12 will be at its end point of travel when the cam follower 33 engages the cam surface 38. As shown in FIG. 3, the follower 33 will ride outwardly along the surface 38 to pivot the angle bars 27 to a position generally normal to the longitudinal centerline of the carrier to thereby move the doors 23 to the open position and dump the feed to the feed bunk 9. Similarly, a second cam follower 33 is mounted on one of the angle bars 27 and is adapted to engage a second cam 35 at the opposite end of the feed bunk to open the doors when the carrier reaches the other end point in its reciprocating path of travel.

To guide the carrier in its reciprocating travel and prevent swaying, a series of guide wheels 39 are journalled on supports 40 extending upwardly from channel 36. A pair of the wheels 39 are located at each end of the feed bunk and ride against the side walls 13 of the carrier to prevent the carrier from swaying.

To drive the carrier 12 in its reciprocating path of travel, a channel 41 is secured to the roller brackets 17 and extends substantially the length of the feed bunk 9. The open end of the channel faces upwardly and a conventional roller link chain 42 is disposed within the channel, and the ends of the chain are secured to the channel by studs 43. The chain 42 extends over a pair of idler sprockets 44 and 45 and a drive sprocket 46. The shaft 47 of idler sprocket 44 and the shaft 48 of idler sprocket 45 are journalled within bearing assemblies 49 mounted on platform 50 which is suitably supported from the ground or foundation by supports 51.

The shaft 52 which carries the drive sprocket 46 is journalled within a bearing assembly 53 mounted on platform 50 and is driven by a motor 54 acting through a conventional speed reduction unit 55. Rotation of the motor drive shaft serves to drive the sprocket 46 to thereby move the chain 42 and the feed carrier 12. The motor is preferably a reversible, variable speed type which is adapted to be reversed when the carrier reaches the end points in its path of travel.

To reverse the direction of rotation of the motor 54 when the carrier reaches the end points in its path of travel, a limit switch 56 is mounted on a bracket 57 secured to one of the supports 40. A projection 58 is secured to one of the side walls 13 of the carrier 12 and is positioned so that the projection 58 will engage and actuate the limit switch 56 when the carrier reaches its end point of travel. The limit switch 56 acts through a conventional latching relay mechanism to reverse the direction of the motor 54 so that the carrier will then move in the opposite direction. A second limit switch 56 is carried by one of the supports 40 at the opposite end of the feed bunk and operates in a similar manner to reverse the motor 54 when the carrier reaches that end of the feed bunk.

In operation of the feeder, the carrier 12 is moved along the track 20 and feed is continuously discharged from chute 7 into the carrier. As the carrier approaches an end point in its path of travel, one of the cam followers 33 will engage the corresponding cam 35 to thereby open the doors 23 and dump the feed to the feed bunk 9. Simultaneously, the projection 58 will engage the limit switch 56 to thereby reverse the motor 54 so that the carrier 12 will then move in the opposite direction. As the carrier moves in the opposite direction, the feed being discharged from the conveyor 3 through chute 7, will be distributed throughout the length of the carrier as it moves to the opposite end of the feed bunk. As the carrier 12 approaches the opposite end, the other cam follower 33 will engage the corresponding cam 35 to again open the doors 23 so that the feed will be dumped from the entire length of the carrier onto the feed bunk 9. Simultaneously, the projection 58 will engage the limit switch 56 at that end of the feed bunk to reverse the motor and move the carrier in the opposite direction. This back-and-forth cycling is repeated until the desired quantity of feed has been distributed to the feed bunk.

FIGS. 7 to 9 illustrate a modified form of the invention in which a series of feeding units 59, corresponding to feeding units 8 of the first embodiment, are located beneath the main conveyor 3. Each of the feeding units 59 includes a series of carriers 60 which are mounted in end-to-end relation on a horizontal shaft 61. Each carrier is generally V-shaped in cross section and having an open upper end and comprising a pair of side walls 62 and a pair of end walls 63. A series of braces 64 are secured to the end walls and reinforce the carriers, as well as providing a direct attachment to the shaft 61 which extends through suitable openings in the end walls 63.

The shaft 61 and carrier 60 are supported from, and journalled in, a series of hangers 65. The lower ends of the hangers 65 extend downwardly between the end walls 63 of adjacent carriers 60 and are provided with suitable openings within which the shaft 61 is journalled. The upper end of each of the hangers 65 carries a roller 66 which rides on rail 67 of track 68. The track 68 is similar to track 20 of the first embodiment and is supported from beam 69 by studs 70.

The carriers 60 are moved in a reciprocating path of travel along the feed bunk 9 by a drive mechanism similar to that described with respect to the first embodiment. A channel 71, similar to channel 41 of the first embodiment, is secured to the hangers 65 and a chain 72 is secured within the channel and is trained over idler sprockets 73 and 74 and drive sprocket 75. The drive sprocket 75 is driven by a reversible, variable speed motor 76 acting through a speed reduction unit 77. Rotation of the motor drive shaft serves to move the chain 72 and channel 71 to thereby move the carriers all along the feed bunk 9.

The motor 76 is reversed in a manner similar to that previously described. A limit switch 78 is mounted on a support 79 at each end of the feed bunk and projections 80 on carriers 60 are adapted to actuate the limit switches when the carriers reach each end of their path of travel. The switches 78 act through a conventional latching relay mechanism to reverse the direction of the motor 76.

The feed is continuously discharged from chute 7 into the carriers 60 as the carriers move in their path of travel. As the carriers 60 approach the end point of their path of travel, the carriers 60 are simultaneously rotated to an inverted position to dump the feed onto the feed bunk 9. The mechanism for rotating the carriers 60 includes a sprocket 81 which is attached to the end of the shaft 61. A chain 82 connects the sprocket 81 with a sprocket 83 on the output shaft of a speed reducing unit 84 driven by motor 85. The speed reducing unit 84 and motor 85 are mounted on platform 86 secured to the end wall 63 of the last carrier 60 in the train. A limit switch 87 is mounted on a bracket 88 supported on hanger 65 and is adapted to be engaged by a pin 89 secured to the sprocket 81. As best shown in FIG. 9, the limit switch 87 and the limit switch 78 are connected in parallel across one of the power lines leading to the motor 85. When the carriers 60 are in the normal upright feed-receiving position, the pin 89 will be in engagement with the normally closed limit switch 87, so that the switch 87 will be open and switch 78 will also be open. As the carriers approach the end point of their path of travel, the limit switch 78 will be engaged by projection 80 to close the limit switch 78 and thereby close the circuit to the motor 86. Closing the circuit to the motor 86 will cause sprocket 81 to rotate to thereby rotate the shaft 61 and dump the feed from the feed carriers 60. Rotation of sprocket 81 will move pin 89 out of engagement with switch 87 and switch 87 will close. The sprocket 81 will rotate 360° until the pin 89 re-engages the limit switch 87 to thereby open the switch 87 and open the circuit to the motor 85. The carriers 60, at this time, have immediately started their reverse travel so that the projection 80 is out of engagement with the limit switch 78 so that the limit switch 78 is again open as soon as the carriers reverse their travel.

As shown in FIG. 1, three feed units 8 are employed. However, it is contemplated that one or more feed units may be used, depending upon the size of the feed area and the number of livestock to be fed. Any type of feed supply member can be used to supply feed to the carrier 12. For example, a hopper, elevator, or the like, can be used in place of the conveyor 3 and chute 7. Feed can be discharged directly from a storage structure or silo to the carrier 12, or as shown in the drawings, the feed can be conveyed through a conveying system before entering the feed supply member.

While the drawings illustrate the feeding units as being straight in shape and the carriers 12 moving in a straight reciprocating path, it is contemplated that the guide tracks could be circular or other shape, and the carriers 12 would have a corresponding shape.

As there is no mechanical agitation of the feed within the carriers, the rough and fine materials of the feed will not be separated, as in the case of an auger-type feeder. This results in uniform distribution of the various types of feed throughout the entire length of the feed bunk.

As the feed itself is not being conveyed, but instead, the feed trough or carrier is moved, the frictional resistance is reduced and substantially lower power requirements are needed for a given feeding capacity.

The amount of feed to be distributed in a feed bunk can be regulated, either by the number of the dumps which are made or by varying the speed of travel of the carrier. In some situations, it may be desired to dump the feed only at one end of the feed bunk and in this case the door opening mechanism at one end could be removed or de-activated so that the doors would only open at one end. This would result in the carrier receiving a double load of feed between dumpings.

Various modes of carrying out the invention are contemplated as being within the scope of the following claims particularly pointing out and distinctly claiming the subject matter which is regarded as the invention.

I claim:

1. A livestock feeding apparatus comprising a guide track, an elongated carrier mounted for movement on the guide track and having an open top to receive feed and having a discharge opening in the bottom of the carrier, drive means for moving the carrier in a path of travel on said guide track, a pair of doors enclosing the bottom opening in said carrier, the side edges of the doors being in opposed proximate relation when the doors are in the closed position and said doors extending substantially the length of the carrier, a lever arm pivotally connected to the doors and disposed at an acute angle to the longitudinal centerline of the carrier, and means responsive to the carrier reaching a given point in its path of travel for pivoting the lever arm to thereby move the doors laterally with respect to said centerline to space the side edges apart and permit feed to fall by gravity between said doors to the feed area.

2. A livestock feeding apparatus, comprising a guide track, an elongated carrier mounted for movement on the guide track and having an open top to receive feed and having an open bottom to discharge feed, drive means for moving the carrier in a path of travel on said guide track, fixed feed supply means located above the path of travel of the carrier for continuously discharging feed into the open top of the carrier, said carrier including a pair of side walls and a series of transverse walls extending between the side walls, a pair of doors mounted for movement in the horizontal plane and enclosing said open bottom, a support rod connected to each transverse wall and extending downwardly between the doors, guide means secured to each rod and engageable with said track, a lever arm pivotally connected to the lower end of each rod and pivotally connected to said doors, said lever arm being disposed at an acute angle to the longitudinal centerline of the carrier when the doors are in a closed position, and fixed means disposed to be engaged by said lever arm for pivoting the lever arm to a position generally normal to the centerline of the carrier to thereby open the doors and permit the feed to be discharged to the feed area.

3. The structure of claim 2 in which the fixed means includes a cam, and a cam follower is operably connected to the lever arm and rides on said cam to pivot said lever arm and open the doors.

4. The structure of claim 2 and including fixed guide means disposed to engage the side walls of the carrier as the carrier moves in its path of travel to prevent swaying of the carrier.

5. A livestock feeding apparatus, comprising a guide track, an elongated carrier mounted for movement on the guide track and having open top to receive feed and having a discharge opening in the bottom thereof, drive means for moving the carrier in a path of travel on said guide track, closure means enclosing the discharge opening in the carrier and including at least one door movable between open and closed positions, an arm connected to the door and disposed in acute angle to the longitudinal center line of the carrier when the door is in the closed position, and fixed obstruction means disposed to be engaged by the arm when the carrier reaches a given point in its path of travel for pivoting the lever arm and moving the door to the open position to thereby permit the feed to fall by gravity from the carrier to a feeding area.

6. A livestock feeding apparatus, comprising a guide track, a carrier mounted for movement in a reciprocating path of travel on the guide track and having an open top to receive feed and an open bottom with transversely moving closure means including pivotal means for opening and closing said means, a flexible elongated member disposed generally parallel to the longitudinal axis of the carrier and having spaced portions thereof secured to the carrier, a fixed drive member located at substantially the mid-point of said reciprocating path of travel and engaged with the flexible member between said spaced portions, reversible drive means for driving the drive member and moving the flexible member and the carrier relative to said drive member, means responsive to the carrier reaching a given point in its point of travel for dumping the feed from the carrier, and means responsive to the carrier reaching said given point for reversing the drive means to thereby move the carrier in the reverse direction on said track.

7. A livestock feeding apparatus, comprising a guide track, an elongated carrier mounted for movement in a reciprocating path of travel on the guide track and having open top to receive feed and an open bottom with transversely moving closure means including pivotal means for opening and closing said means, fixed feed supply means located above the path of travel of the carrier for continuously discharging feed in the open top of the carrier, a chain disposed generally parallel to the longitudinal axis of the carrier with the end portions of the chain being secured to the carrier, a sprocket located at substantially the mid-point of said path of travel and mounted on a stationary support and engaged with the chain between said end portions, reversible drive means for rotating the sprocket to thereby move the chain and the carrier relative to the stationary support, and means responsive to the carrier reaching a given point in its path of travel for dumping the feed from the carrier to a feeding area.

References Cited by the Examiner
UNITED STATES PATENTS

| | | | |
|---|---|---|---|
| 2,536,621 | 1/1951 | Arnold | 119—21 |
| 2,657,782 | 11/1953 | Gerber | 214—17 |
| 2,987,038 | 6/1961 | Cole | 119—18 |
| 3,014,456 | 12/1961 | Shawk | 119—99 |
| 3,108,572 | 10/1963 | Reed | 119—52 |
| 3,123,050 | 3/1964 | Haen | 119—52 |
| 3,132,738 | 5/1964 | Engseth | 119—52 X |
| 3,155,286 | 11/1964 | Van Peursem | 222—166 |

SAMUEL KOREN, *Primary Examiner.*

ALDRICH F. MEDBERY, *Examiner.*